United States Patent
Bruning

(10) Patent No.: US 6,339,314 B1
(45) Date of Patent: Jan. 15, 2002

(54) BATTERY CHARGER CIRCUIT WITH LOW STANDBY POWER DISSIPATION

(75) Inventor: Gert W. Bruning, Briarcliff Manor, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/749,712

(22) Filed: Dec. 27, 2000

(51) Int. Cl.[7] .................................................. H02J 7/00
(52) U.S. Cl. ...................................................... 320/128
(58) Field of Search .............................. 320/108, 122, 320/128; 307/30, 38, 126, 112

(56) References Cited

U.S. PATENT DOCUMENTS

| 5,307,001 A | * | 4/1994 | Heavey ...................... 320/125 |
| 5,565,714 A | * | 10/1996 | Cunningham ................ 307/112 |
| 5,623,321 A | | 4/1997 | Harsanyi ..................... 348/730 |
| 5,671,017 A | | 9/1997 | Chujo ......................... 348/378 |
| 5,753,980 A | * | 5/1998 | Peterson ...................... 307/39 |
| 5,789,098 A | * | 8/1998 | Pinder ........................ 307/112 |
| 5,939,803 A | * | 8/1999 | Frost .......................... 307/126 |
| 6,057,609 A | * | 5/2000 | Nagai et al. .................. 307/66 |
| 6,204,637 B1 | * | 3/2001 | Rengan ....................... 307/150 |

FOREIGN PATENT DOCUMENTS

WO    WO9530183    9/1995    ......... G05F/1/455

* cited by examiner

*Primary Examiner*—Peter S. Wong
*Assistant Examiner*—Pia Tibbits
(74) *Attorney, Agent, or Firm*—Dicran Halajian

(57) ABSTRACT

The invention concerns an electronic circuit for reducing the current consumption of a transformer (1). This circuit comprises a control circuit in the secondary circuit of the transformer (1) and a switch (2), controlled by the control circuit, in the primary circuit of the transformer (1) for separating the primary circuit of the transformer (1) from the power supply (3). The control circuit comprises a detector (6) for detecting the no-load state of the transformer (1). If the transformer (1) is in the no-load state, the switch (2) on the primary side is opened at least temporarily.

27 Claims, 2 Drawing Sheets

BATTERY CHARGER CIRCUIT WITH LOW STANDBY POWER DISSIPATION

FIELD OF THE INVENTION

The present invention relates generally to a battery charger circuit, and, more particularly, to a circuit arrangement to reduce standby current.

BACKGROUND OF THE INVENTION

Battery chargers for electric shavers, mobile phones, fax machines, cordless phones, and other electronic devices generally include a relatively simple, low cost, low frequency (i.e., 50/60 Hz) transformer circuit. Typically, the transformer circuit has a simple diode rectifier at the output of a secondary winding. Although this type of transformer circuit may be adequate for certain applications, these transformer circuits consume a considerable amount of electrical energy without a load being coupled to the output. This condition is usually referred to as standby.

The consumption of electrical energy during standby results from the non-ideal input characteristics of the transformer (i.e., magnetizing inductance) that permit magnetizing current to flow in a primary winding of the transformer circuit when connected to a power source. This magnetizing current flows through the primary winding of the transformer and also induces magnetic flux within the iron core of the transformer, both of which usually have power losses. In a typical situation, the losses of a transformer circuit during standby may exceed one (1) watt of power.

To prevent this standby loss, battery charger circuits have been developed with common high frequency inverter circuits. These circuits often utilize sophisticated integrated control circuits which can reduce power consumption during standby. However, these battery charger circuits are relatively expensive and have limited consumer acceptance.

SUMMARY OF THE INVENTION

The present invention provides a relatively simple, low cost battery charger circuit to reduce power consumption during standby. The battery charger circuit controls the current supplied to a transformer. The battery charger circuit determines the magnitude of the value of the current flowing to a primary winding of the transformer. When the value of the primary current includes a load current and a magnetizing current, the battery charger circuit continues to supply current to the primary winding of the transformer to charge the load. When the value of the primary current only includes a magnetizing current, the primary current is prevented from flowing to the transformer for a pre-set time or interval. Accordingly, the magnetizing current only flows to the primary winding of the transformer for a relatively short period of time, thereby reducing power consumption during standby.

A battery charger circuit in accordance with the present invention includes a switching element in series with a primary winding of a transformer. Control circuitry renders the switching element conductive during an on period so as to produce a current through the series arrangement and renders the switching element non-conductive during an off period.

Another battery charger circuit in accordance with the present invention includes a triggerable electronic switch to provide charging current when a load is present and to shut off the charging current when there is no load. A threshold detector is coupled to the triggerable electronic switch to trigger the triggerable electronic switch when the voltage of the threshold detector reaches a predetermined value.

Another battery charger circuit in accordance with the present invention includes a triggerable electronic switch having a gate terminal and first and second terminals through which an alternating current is supplied. The triggerable electronic switching allows current to flow to the transformer when there is a load and prevents current from flowing to the transformer when there is no load. A sensing element is coupled between the second terminal of the triggerable electronic switch and a primary winding of the transformer, and a capacitive element is coupled to the second terminal of the triggerable electronic switch. An input of the threshold detector is coupled to the gate of the triggerable electronic switch to allow current to flow to the gate terminal of the triggerable electronic switch at a predetermined voltage of the capacitive element. A load detector circuit is coupled to the sensing resistor. A switching element allows the capacitive element to be charged when a first current is sensed by the load detection circuit and to prevent the capacitive element from charging when a second current is sensed by the load detection circuit.

A method in accordance with the present invention includes the steps of providing current to charge a capacitive element, rendering a threshold switch conductive when the voltage of the capacitive element reaches a predetermined voltage to supply a latching current through threshold switch, and rendering a triggerable electronic switch conductive in response to the latching current to provide a primary current. The method also includes the steps of sensing the primary current at predetermined intervals to determine whether there is a load, maintaining the triggerable electronic switch in a conductive position when the value of the primary current includes a load current plus a magnetizing current, and opening the triggering electronic switch to interrupt the primary current for a predetermined interval when the value of the primary current only consists of the magnetizing current.

Another method in accordance with the present invention includes the steps of defining a current path in series with a first winding of a transformer, and sensing current flowing through the current path. The method also includes the steps of allowing the current to flow to the first winding when the current includes a load current and a magnetizing current, and preventing the current from flowing to the first winding when the current includes only a magnetizing current.

It is to be understood that both the foregoing general description and the following detailed description are exemplary and explanatory and are intended to provide further explanation of the invention as claimed.

The invention, together with attendant advantages, will be best understood by reference to the following detailed description of the preferred embodiment of the invention, taken in conjunction with the accompanying drawings.

DETAILED DESCRIPTION OF THE PRESENTLY PREFERRED EMBODIMENTS

Before explaining the present embodiments in detail, it should be understood that the invention is not limited in its application or use to the details of construction and arrangement of parts illustrated in the accompanying drawings and description. It will be recognized that the illustrative embodiments in accordance with the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limitation.

Figure 1:
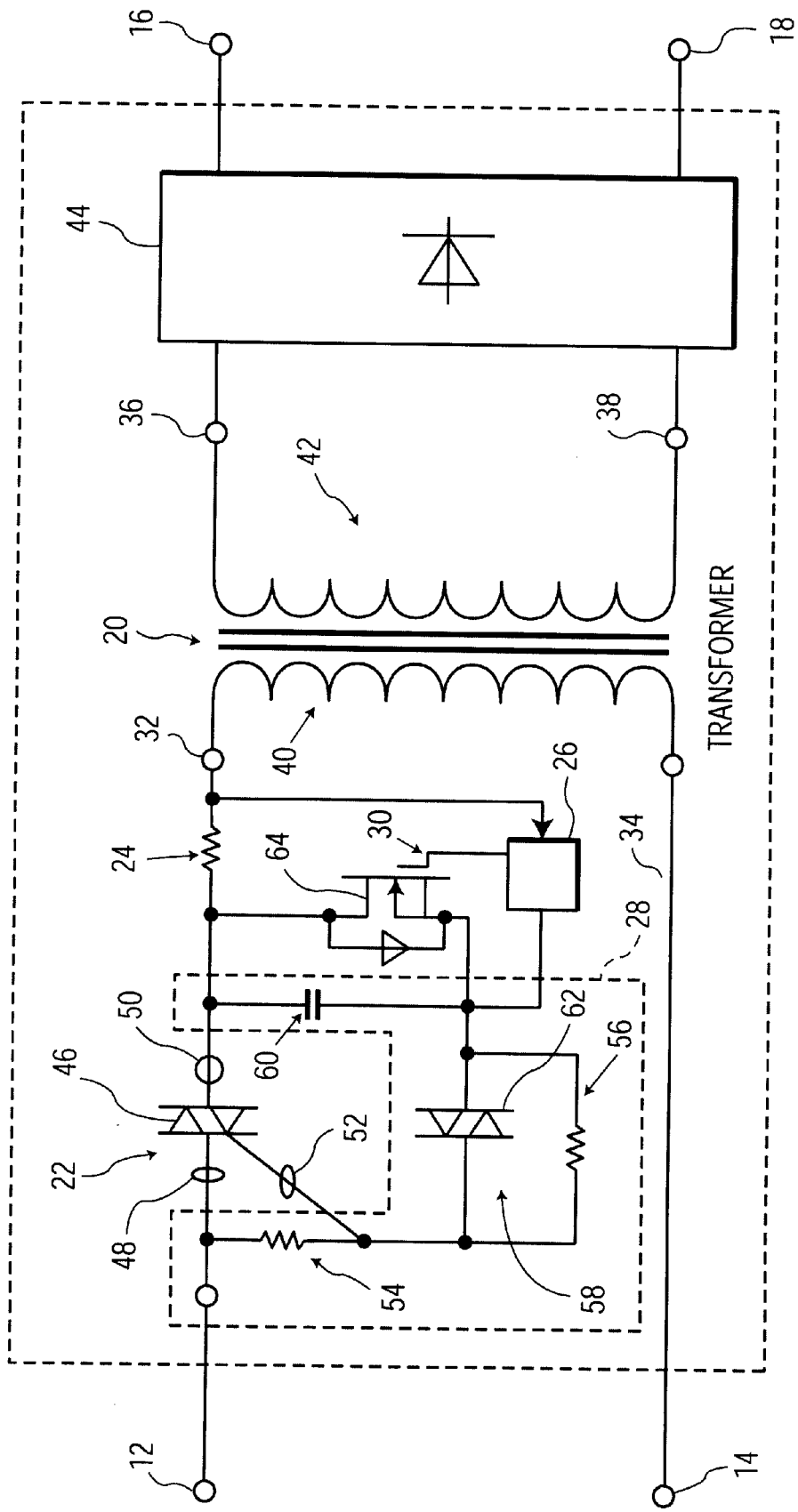
FIG. 1 is a schematic diagram of an embodiment of a battery charger circuit accordance with a preferred embodiment of the present invention.

Referring now to the drawings, and more particularly to FIG. 1, a schematic diagram of an embodiment of a battery charger circuit 10 is illustrated. The battery charger circuit 10 controls the supply of current to reduce power dissipation during standby. The battery charger circuit 10 generally includes input terminals 12, 14, output terminals 16, 18, a transformer 20, a triggerable electronic switch 22, a sensing element 24, a load or current sensing circuit 26, a triggering circuit 28, and a switching element 30.

The input terminals 12, 14, of the battery charger circuit 10 are connected to a power supply or reference source (not shown). The power supply provides primary or charging current to the transformer 20. The power supply can be an alternating voltage source having an AC line voltage of 120 volts and a frequency of 60 hertz or an AC line voltage of 230 volts and a frequency of 50 hertz. It will be recognized that the power supply can be any suitable power source to provide power to the battery charger circuit 10.

The transformer 20 of the battery charger circuit 10 has two input terminals 32, 34 and two output terminals 36, 38. The input terminals 32, 34 of the transformer 20 are connected to a primary winding or inductive element 40, and the output terminals 36, 38 are connected to a secondary winding or inductive element 42. When current flows through the primary winding 40, a voltage is induced in the secondary winding 42 to supply an output current to a load (not shown), such as, a battery, to be charged. The output terminals 36, 38 of the transformer are preferably coupled to the load output by an output rectifier circuit or diode rectifier 44. The positive terminal of the load can be connected to the terminal 16 of the charger circuit 10 and the negative terminal of the load can be connected to the terminal 18 of the charger circuit 10.

The triggerable electronic switch 22 of the battery charger circuit 10 controls current supplied to the transformer 20. For example, when the triggerable electronic switch 22 is in an "on" state (closed) or conductive state, current will flow to the primary winding 40 of the transformer 20. When the triggerable electronic switch 22 is in an "off" state (open) or non-conductive state, current will be prevented from flowing to the transformer 20. The triggerable electronic switch 22 preferably includes a bi-directional switch or triac 46 having a first main electrode 48, a second main electrode 50, and a gate electrode 52. The first main electrode 48 of the triac 46 is connected to the input terminal 12 of the battery charger circuit 10 and the second main electrode 50 is connected to the sensing element 24. The gate electrode 52 of the triac is connected to the input terminal 12 via a resistive element 54 of the triggering circuit 28.

The gate electrode 52 controls the switching or conduction (i.e., firing) of the triac 46. When the current supplied to the gate electrode 52 reaches a predetermined value (i.e., a latching current), the triac 46 turns "on" (closes) or conducts permitting current to flow through the triac 46 to the sensing element 24. The triac will remain on as long as the current flowing into the gate electrode remains above a predetermined value to sustain conduction of the triac (i.e., a holding current). When the level of the current in the gate electrode decreases below the holding current, the triac turns "off" (non-conductive). The firing angle, that is, the angle between 0 and 180 degrees at which the triac first conducts, can be adjusted or controlled by the triggering circuit 28.

The triggering circuit 28 of the battery charging circuit 10 triggers or fires the triac at an arbitrary selected angle for phase conduction. The triggering circuit 28 preferably includes resistive elements 54, 56, a threshold device 58, and a capacitor element 60. One end of the resistive element 54 is connected to the input terminal 12 of the battery charger circuit 10 and the other end of the resistive element 54 is connected to the gate electrode 52 of the triac 46. One end of the resistive element 56 is connected to the gate electrode 52 of the triac 46 and the other end of the resistive element 56 is connected to the capacitive element 60.

The capacitive element 60 of the triggering circuit 28 supplies current to the gate electrode 52 of the triac 46 to fire the triac. Preferably, the capacitive element includes a capacitor. One end of the capacitive element 60 is connected to the second main electrode 50 of the triac 46 and the other end of the capacitive element is connected to a node or junction formed between the resistive element 56 and the threshold device 58. When power is supplied to the input terminals 12, 14 of the battery charger circuit 10, the capacitive element 60 charges through the serial combination of resistive elements 54 and 56. Once the voltage of the capacitive element 60 reaches a predetermined valve, the threshold device 58 turns "on" (closes) or conducts.

The threshold device 58 of the triggering circuit 28 controls the triggering of the triac 46 by providing current to the gate electrode 52 of the triac 46. One end of the threshold device 58 is connected to the gate electrode 52 of the triac 46 and the other end of the threshold device 58 is connected to a node formed between the resistive element 56 and the capacitive element 60. Preferably, the threshold device 58 is a diac 62. When the voltage on the capacitive element 60 reaches a breakdown voltage of the diac 62, the diac 62 turns "on" (closes) to allow current (i.e., a latching current) to be supplied through diac 62 to the gate electrode 52 of the triac 46.

The switching element 30 of the battery charger circuit 10 controls the activation of the triggering circuit 28 in order to supply current to the primary winding 40 of the transformer 20. The switching element 30 preferably includes a transistor 64 having an emitter, a collector and a base. The transistor 64 is preferably a MOSFET transistor. The collector of the transistor 64 is connected to the sensing element 24, and the emitter of the transistor 64 is connected to a node formed between the resistor 56, the triggerable element 58, and the capacitive element 60. The gate of the transistor 64 is connected to the load sensing circuit 26.

The load detection circuit 26 of the battery charger circuit 10 senses or measures the magnitude of the value of the primary current flowing through the sensing element 24 at predetermined times or intervals (i.e., 0.01% duty cycle) to detect whether a load is connected to the output terminals 16, 18 of the battery charging circuit 10. If the value of the primary current includes a load current plus a magnetizing current, the load detection circuit 26 opens the switching element 30 to cause the triggerable electronic switch to turn "on" (close) or conduct since a load is detected to be charged. If the value of the primary current only includes a magnetizing current, the load detection circuit 26 turns "on"

(closes) the switching element 30 to prevent the triggering circuit 28 from firing or closing the triggerable electronic switch 22 since there is no load to be charged. When there is no load, the load detection circuit 26 maintains the switching element 30 in a conductive position for the pre-set interval. Thereafter, the load detection circuit 26 senses the magnitude of the value of the primary current flowing through the sensing element 24 and, depending on the magnitude, causes the triggerable electronic switch 22 to be conductive or non-conductive to control the current to the transformer 20. The load detection circuit 26 can include a voltage comparator, a current difference detection circuit, a timing circuit and/or other suitable circuits known by those skilled in the art for determining the current flowing through the sensing element 24 at predetermined times.

The operation of the battery charger circuit 10 will now be described with reference to FIG. 1. Initially, the voltage across the capacitive element 60 is assumed to be zero with the diac 62 in its "off" state (non-conductive) so that the diac 62 is non-operative. The triac 46 is also "off" (non-conductive) and no current is flowing to the primary winding 40 of the transformer 20. The switching element 30 is in its "off" state (non-conductive) to allow the capacitive element 60 to be charged. The current through the sensing element 24 is negligible and the voltage across the load is initially equally to zero.

During the positive half wave cycle of the supply voltage and as long as the triac 46 is not yet conducting, current flows through resistive elements 54, 56 to charge the capacitive element 60. When the voltage of the capacitive element 60 reaches a breakover or breakdown voltage of the diac 62, the diac breaks downs and switches to its "on" (closed) or conductive state. During the breakdown voltage, the capacitive element 60 discharges causing current to flow through the diac 62 and into the gate electrode 52 of the triac 46. The current supplied to the gate electrode 52 causes the triac 46 to fire (i.e., conduct) allowing alternating current to flow through the sensing element 24 and into the primary winding 40 of the transformer 20.

Near or at the end of the positive half wave cycle, the level of the current flowing into the gate electrode 52 of the triac 46 will not be adequate to sustain conduction of the triac 46 and the triac turns "off" (non-conductive). This can occur at approximately the "zero crossing point" between alternate half cycles of the alternating voltage applied to the input terminals 12, 14 of the battery charger circuit 10. A similar situation occurs in the negative half wave cycle, except that the gate current is generated once the voltage of the capacitor exceeds a negative breakdown voltage.

During the positive and negative half wave cycles, the load detection circuit 26 can sense the current flowing through the sensing element 24 at preset or predetermined intervals. Preferably, the load detection circuit 26 closes the switching element 30 at predetermined intervals and senses the current. When there is no load connected to the output terminals 16, 18 of the battery charging circuit 10, the current sensed through the sensing element 24 by the load detection circuit 26 will only include magnetizing current. As a result, the load detection circuit 26 maintains the switching element 30 in an "on" state (closed) to prevent the diac 62 from firing the triac 46. Thus, the triac will be switched off and no current will flow to the primary winding 40 of the transformer 20. The triac 46 will not be triggered as long as the switching element 30 is conductive. After a pre-set interval, the load detection circuit 26 renders non-conductive the switching element 30 to allow the triggering circuit 28 to fire the triac 46 and senses the current flowing through the sensing element 24.

When a load is connected to the output terminals 16, 18 of the battery charger circuit 10, the current sensed through the sensing element 24 by the load detection circuit 26 will include a load current plus a magnetizing current. As a result, the load detection circuit 26 turns "off" or renders non-conductive the switching element 30 to allow the triggering circuit 28 to fire the triac 46. The triac 46 will continue to be fired as long as the switching element 30 is non-conductive. After a predetermined time or period, the load detection circuit 26 closes the switching element and senses the current.

Figure 2:
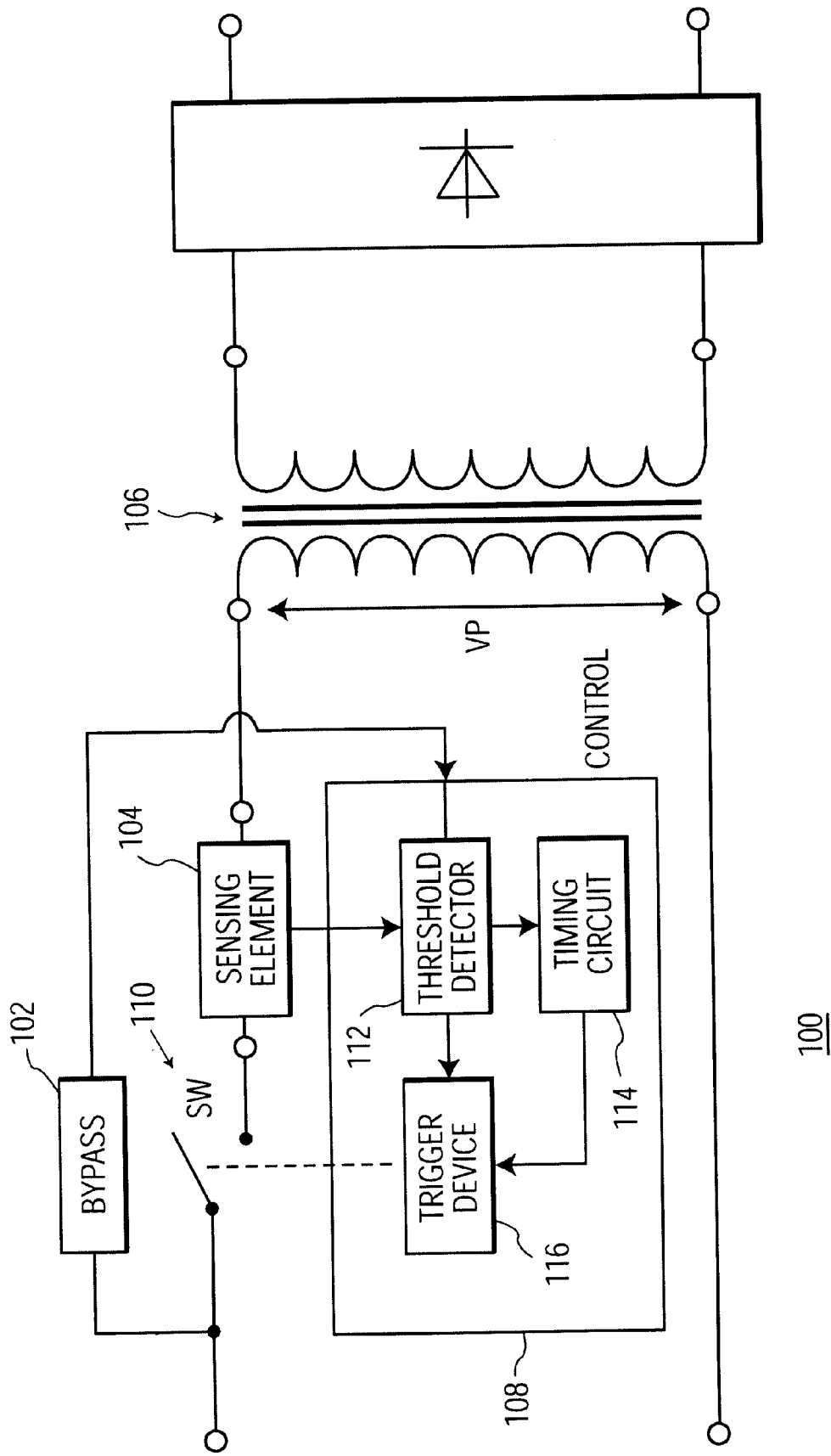
FIG. 2 is a schematic diagram of another embodiment of a battery charger circuit accordance with a preferred embodiment of the present invention.

FIG. 2 illustrates a schematic diagram of another embodiment of a battery charger circuit 100. The battery charger circuit 100 controls the supply of current to reduce power dissipation during standby. The battery charger circuit 100 includes a bypass device 102, a sensing element 104, a transformer 106, control circuitry 108, and a switching element 110.

The switching element 110 of the battery charger circuit 100 controls current supplied to the transformer 106. When the switching element 110 is in an "on" state (closed) or conductive state, current will flow to the primary winding of the transformer 106. When the switching element 110 is in an "off" state (open) or non-conductive state, current will be prevented from flowing to the transformer 106. The switching element 110 can include any suitable switch, such a transsistor or triac.

The bypass device 102 of the battery charger circuit 100 energizes or activates the control circuitry 108 when the switching element 110 is non-conductive. The bypass device 102 can include a resistor, a capacitor, an inductor, or a combination thereof.

The control circuitry 108 controls the triggering of the switching element 110. When there is no load, the control circuitry 108 maintains the switching element 110 in a conductive position for a pre-set interval. Thereafter, the control circuitry 108 senses the magnitude of the value of the primary current flowing through the sensing element 104 and causes the switching element 110 to conductive or non-conductive to control the current to the transformer 106. The control circuitry 108 preferably includes a threshold detector 112, a timing circuit 114, and a trigger device 116.

The threshold detector 112 of the control circuitry 108 senses or measures the magnitude of the value of the primary current flowing through the sensing element 104 to detect whether a load is connected to the battery charging circuit 110. If the value of the primary current includes a load current plus a magnetizing current, the threshold detector 112 causes the trigger device 116 to close the switching element 110. If the value of the primary current only includes a magnetizing current, the threshold detector 112 causes the trigger device 116 to open the switching element 110 or prevents the closing of the switching element 110 since there is no load to be charged. The threshold detector 112 can include a comparator circuit with a threshold generator or any other suitable integrated circuit. The triggering device 116 can include a diac device with a capacitor, a gate driver, or any other suitable device.

The timing circuit 110 triggers the control circuitry 108 at predetermined intervals to check for the presence of the load current. The timing circuit can include a R-C time constant timer circuit, a digital counter, or any other suitable timing circuit. The sensing element 104 of the battery charger circuit can include a resistor, a coil, a resistive element or trace, a suitable integrated circuit, or other suitable sensing element.

The battery charger circuits described herein are a relatively simple, low cost circuits that reduce power consumption during standby. The battery charger circuits control the current supplied to the primary winding of a transformer. The battery charger circuits can determine the magnitude of the value of the current flowing to the primary winding of the transformer. When the value of the primary current includes a load current and a magnetizing current, the battery charger circuits continue to supply current to the primary winding of the transformer to charge the load. When the value of the primary current only includes a magnetizing current, the primary current is prevented from flowing to the transformer for a pre-set time or interval. Therefore, the magnetizing current only flows to the primary winding of the transformer for a relatively short period of time, thereby reducing power consumption during standby.

Although the battery charger circuits have been described in detail by way of illustration and example, it should be understood that a wide range of changes and modifications can be made to the preferred embodiments described above without departing in any way from the scope and spirit of the present invention. Thus, the described embodiment is to be considered in all aspects only as illustrative and not restrictive, and the scope of the invention is, therefore, indicated by the appended claims rather than the foregoing description. All changes that come within the meaning and range of equivalency of the claims are to be embraced within their scope.

I claim:

1. A battery charger circuit for controlling a current through a primary winding of a transformer comprising:
    a triggerable electronic switch having a gate terminal and first and second terminals through which an alternating current is supplied, the triggerable electronic switching allowing current to flow to the transformer when there is a load and preventing current from flowing to the transformer when there is no load;
    a sensing element coupled between the second terminal of the triggerable electronic switch and the primary winding of the transformer;
    a capacitive element coupled to the second terminal of the triggerable electronic switch;
    a threshold detector having an input and an output, the input of the threshold detector coupled to the gate terminal of the triggerable electronic switch to allow current to flow to the gate terminal of the triggerable electronic switch at a predetermined voltage of the capacitive element;
    a load detector circuit coupled to the sensing element to sense the current flowing through the sensing element; and
    a switching element to allow the capacitive element to be charged when a first current is sensed by the load detection circuit and to prevent the capacitive element from charging when a second current is sensed by the load detection circuit.

2. The battery charger circuit of claim 1, wherein the triggerable electronic switch comprises one of a triac and a bi-directional switch.

3. The battery charger circuit of claim 1, wherein the threshold detector comprises a diac.

4. The battery charger circuit of claim 1, wherein the switching element comprises a transistor.

5. The battery charger circuit of claim 1, wherein the predetermined voltage is a breakdown voltage of the threshold detector.

6. The battery charger circuit of claim 1, further comprising a resistor coupled to the gate terminal of the triggerable electronic switch and the in put of the threshold detector.

7. The battery charger circuit of claim 1, further comprising a power supply to p provide current to the first terminal of the triggerable electronic switch.

8. The battery charger circuit of claim 1, wherein the first current includes a load current and a magnetizing current and the second current only includes the magnetizing current.

9. A battery charger circuit comprising:
    a transformer having a primary winding and a secondary winding;
    a triggerable electronic switch to provide a charging current when a load is connected to the secondary winding and to shut off the charging current when the load is disconnected from the secondary winding;
    a sensing element connected between the triggerable electronic switch and the primary winding; and
    a threshold detector coupled to the sensing element to trigger the triggerable electronic switch to a conductive state when a voltage of the threshold detector reaches a predetermined value and to maintain said conductive state when a load current is flowing through said sensing element.

10. The battery charger circuit of claim 9, wherein the triggerable electronic switch includes one of a triac switch and a bi-directional switch.

11. The battery charger circuit of claim 9, wherein the threshold detector comprises a diac.

12. The battery charger circuit of claim 9, further comprising a capacitive element coupled to the threshold detector.

13. The battery charger circuit of claim 9, further comprising a switching element coupled to the threshold detector.

14. The battery charger circuit of claim 9, further comprising a load detection circuit coupled to threshold detector.

15. A battery charger circuit comprising:
    a switching element;
    a sensing element connected in series between the switching element and a primary winding of a transformer; and
    a control circuitry for rendering the switching element conductive when a load current is flowing through the sensing element and for rendering the switching element non-conductive when the load current is not flowing through the sensing element.

16. The battery charger circuit of claim 15 further comprising a bypass device coupled to the control circuitry.

17. The battery charger circuit of claim 15 wherein the control circuitry comprises a threshold detector.

18. The battery charger circuit of claim 15 wherein the control circuitry comprises a timing circuit.

19. The battery charger circuit of claim 15 wherein the control circuitry comprises a trigger device.

20. The battery charger circuit of claim 15 wherein the control circuitry comprises a threshold detector coupled to a triggering device and a timing circuit.

21. The battery charger circuit of claim 15, wherein said load current is greater than a magnetizing current, said magnetizing current flowing through said primary winding when a load is not connected to a secondary winding of said transformer.

22. A method of charging a load comprising:
    providing current to charge a capacitive element;

rendering a threshold switch conductive when a voltage of the capacitive element reaches a predetermined voltage to supply a latching current through the threshold switch;

rendering a triggerable electronic switch conductive in response to the latching current to provide a primary current in a primary winding of a transformer;

sensing the primary current at predetermined intervals to determine whether there is a load;

maintaining the triggerable electronic switch in a conductive position when the primary current includes a load current plus a magnetizing current; and opening the triggering electronic switch to interrupt the primary current for a predetermined interval when the primary current only consists of the magnetizing current.

23. The method of claim 22 wherein the triggerable electronic switch is one of a triac switch and a bi-directional switch.

24. The method of claim 22 wherein the threshold detector comprises a diac.

25. The method of claim 22, wherein said load current is greater than a magnetizing current, said magnetizing current flowing through said primary winding when the load is not connected to a secondary winding of said transformer.

26. A method to reduce standby current comprising:

defining a current path in series with a primary winding of a transformer;

sensing a current flowing through the current path;

allowing the current to flow to the primary winding when the current includes a load current and a magnetizing current; and preventing the current from flowing to the primary winding when the current includes only a magnetizing current.

27. The method of claim 26, wherein said load current is greater than a magnetizing current, said magnetizing current flowing through said primary winding when a load is not connected to a secondary winding of said transformer.

* * * * *